US012115803B2

(12) United States Patent
Fisher

(10) Patent No.: US 12,115,803 B2
(45) Date of Patent: Oct. 15, 2024

(54) FADE-RESISTANT WATER-DISPERSIBLE PHENOL-FREE DIRECT THERMAL MEDIA

(71) Applicant: Appvion, LLC, Appleton, WI (US)

(72) Inventor: Mark R. Fisher, Appleton, WI (US)

(73) Assignee: Appvion, LLC, Appleton, WI (US)

( * ) Notice: Subject to any disclaimer, the term of this patent is extended or adjusted under 35 U.S.C. 154(b) by 6 days.

(21) Appl. No.: 17/407,491

(22) Filed: Aug. 20, 2021

(65) Prior Publication Data

US 2022/0184985 A1 Jun. 16, 2022

Related U.S. Application Data

(63) Continuation-in-part of application No. 17/118,217, filed on Dec. 10, 2020.

(51) Int. Cl.

*B41M 5/333* (2006.01)
*B41M 5/323* (2006.01)
*B41M 5/44* (2006.01)

(52) U.S. Cl.

CPC .......... *B41M 5/3333* (2013.01); *B41M 5/323* (2013.01); *B41M 5/44* (2013.01); *B41M 2205/04* (2013.01); *B41M 2205/38* (2013.01)

(58) Field of Classification Search

CPC ...... B41M 5/323; B41M 5/3333; B41M 5/44; B41M 2205/04; B41M 2205/38

See application file for complete search history.

(56) References Cited

U.S. PATENT DOCUMENTS 3,539,375 A 11/1970 Baum
3,674,535 A 7/1972 Blose et al.
3,746,675 A 7/1973 Blose et al.
4,094,687 A 6/1978 Lawton
4,097,288 A 6/1978 Lawton
4,151,748 A 5/1979 Baum
4,169,705 A 10/1979 Boyd et al.
4,181,771 A 1/1980 Hanson et al.

(Continued)

FOREIGN PATENT DOCUMENTS

EP 1 024 409 A2 8/2000
EP 1116713 A1 7/2001

(Continued)

OTHER PUBLICATIONS

Aquasol™ Water Soluble Paper and Tape brochure, 2019 or earlier, 4 pages.

(Continued)

*Primary Examiner* — Gerard Higgins

(74) *Attorney, Agent, or Firm* — Amundsen Davis, LLC

(57) ABSTRACT

We disclose specialized direct thermal recording media that are both phenol-free and water-dispersible. The thermally responsive layer of such media includes a leuco dye and an acidic developer. To avoid image fade and image formation problems associated with certain demanding environmental storage conditions, the developer is not only phenol-free but also a derivative of N,N'-diphenylurea. The thermal recording medium also includes a base coat between the substrate and the thermally responsive layer, the base coat containing a non-water-soluble binder, and a top coat carried by the substrate such that the thermally responsive layer is between the top coat and the substrate.

15 Claims, 2 Drawing Sheets

(56) References Cited

U.S. PATENT DOCUMENTS

| | | | |
|---|---|---|---|
| 4,246,318 | A | 1/1981 | Baum |
| 4,470,057 | A | 9/1984 | Glanz |
| 4,531,140 | A | 7/1985 | Suzuki et al. |
| 4,794,102 | A | 12/1988 | Petersen et al. |
| 5,098,882 | A | 3/1992 | Teraji et al. |
| 5,215,812 | A | 6/1993 | Kano et al. |
| 5,342,649 | A | 8/1994 | Sarokin |
| 5,773,186 | A | 6/1998 | Takashima |
| 5,955,398 | A | 9/1999 | Fisher et al. |
| 6,015,771 | A | 1/2000 | Fisher et al. |
| 6,429,341 | B2 | 8/2002 | Mathiaparanam |
| 6,777,075 | B2 | 8/2004 | Concannon et al. |
| 6,835,691 | B2 | 12/2004 | Mathiaparanam et al. |
| 6,921,740 | B1 | 7/2005 | Hizatate et al. |
| 6,995,784 | B2 | 2/2006 | Kalishek |
| 7,125,824 | B2 | 10/2006 | Mathiaparanam et al. |
| 7,235,308 | B2 | 6/2007 | Druckrey et al. |
| 7,262,150 | B2 | 8/2007 | Kalishek et al. |
| 7,361,399 | B2 | 4/2008 | Song et al. |
| 7,476,448 | B2 | 1/2009 | Natsui et al. |
| 7,485,402 | B2 | 2/2009 | Arai et al. |
| 7,635,662 | B2 | 12/2009 | Kabashima et al. |
| 7,749,580 | B2 | 7/2010 | Song et al. |
| 7,807,738 | B2 | 10/2010 | Kabashima et al. |
| 8,287,961 | B2 | 10/2012 | Hill et al. |
| 8,334,047 | B2 | 12/2012 | Kelly et al. |
| 8,460,774 | B2 | 6/2013 | Bethe |
| 8,480,225 | B2 | 7/2013 | Romano, Jr. et al. |
| 8,536,087 | B2 | 9/2013 | Harrison et al. |
| 8,563,468 | B2 | 10/2013 | Kodama et al. |
| 8,709,546 | B2 | 4/2014 | Zhou et al. |
| 8,795,796 | B2 | 8/2014 | Koenig |
| 8,802,591 | B2 | 8/2014 | Hill et al. |
| 8,877,678 | B2 | 11/2014 | Koyama et al. |
| 8,916,496 | B2 | 12/2014 | Chakar et al. |
| 8,916,497 | B2 | 12/2014 | Fisher et al. |
| 9,034,790 | B2 | 5/2015 | Chakar et al. |
| 9,199,503 | B1 | 12/2015 | Fisher et al. |
| 9,418,576 | B2 | 8/2016 | Franklin |
| 9,534,156 | B2 | 1/2017 | Fisher |
| 9,656,498 | B2 | 5/2017 | Yamane et al. |
| 9,767,714 | B2 | 9/2017 | Franklin |
| 9,789,721 | B2 | 10/2017 | Takano et al. |
| 9,962,980 | B2 | 5/2018 | Morie et al. |
| 10,160,245 | B2 | 12/2018 | Horn |
| 10,184,062 | B2 | 1/2019 | Einsla et al. |
| 10,265,985 | B2 | 4/2019 | Horn |
| 10,933,681 | B2 | 3/2021 | Chakar et al. |
| 11,292,280 | B2 | 4/2022 | Fisher et al. |
| 11,370,241 | B2 | 6/2022 | Fisher et al. |
| 11,376,879 | B2 | 7/2022 | Fisher |
| 11,529,819 | B2 * | 12/2022 | Sakai ..................... B41M 5/155 |
| 11,718,103 | B2 | 8/2023 | Fisher et al. |
| 2001/0044553 | A1 | 11/2001 | Kabashima et al. |
| 2004/0096598 | A1 | 5/2004 | Kasamatsu et al. |
| 2004/0096599 | A1 | 5/2004 | Kobayashi et al. |
| 2004/0191433 | A1 | 9/2004 | Sakaguchi et al. |
| 2005/0096221 | A1 | 5/2005 | Fisher et al. |
| 2007/0042907 | A1 | 2/2007 | Nagasawa et al. |
| 2009/0086032 | A1 | 4/2009 | Li |
| 2009/0155613 | A1 | 6/2009 | Kalishek |
| 2009/0286032 | A1 | 11/2009 | Franklin |
| 2011/0104619 | A1 | 5/2011 | Fujii et al. |
| 2011/0285122 | A1 | 11/2011 | Hill et al. |
| 2016/0031254 | A1 | 2/2016 | Neukirch et al. |
| 2017/0365195 | A1 | 12/2017 | Franklin |
| 2019/0193447 | A1 | 6/2019 | Fisher et al. |
| 2019/0270328 | A1 | 9/2019 | Kishimoto et al. |
| 2019/0291493 | A1 | 9/2019 | Fisher et al. |
| 2021/0155027 | A1 | 5/2021 | Fisher |
| 2021/0340099 | A1 * | 11/2021 | Kinishi ................. C07C 303/28 |
| 2022/0184985 | A1 | 6/2022 | Fisher |
| 2022/0184986 | A1 | 6/2022 | Fisher |
| 2022/0332135 | A1 | 10/2022 | Fisher |
| 2023/0279615 | A1 | 9/2023 | Fisher et al. |

FOREIGN PATENT DOCUMENTS

| | | | | |
|---|---|---|---|---|
| EP | 1565614 | B1 | 7/2007 | |
| EP | 3 103 649 | A1 | 12/2016 | |
| EP | 3677569 | A1 | 7/2020 | |
| JP | 8-2112 | A | 1/1996 | |
| JP | H082112 | A | 1/1996 | |
| JP | 2578069 | B2 | 2/1997 | |
| JP | 2002187364 | A | 7/2002 | |
| JP | 2002283744 | A | 10/2002 | |
| JP | 2004223871 | A | 8/2004 | |
| JP | 2004255842 | A | 9/2004 | |
| JP | 2004314623 | A * | 11/2004 | |
| JP | 2006299498 | A * | 11/2006 | ............. D21H 19/12 |
| JP | 2008194986 | A | 8/2008 | |
| JP | 4721432 | B2 | 7/2011 | |
| JP | 2012061612 | A | 3/2012 | |
| JP | 2016 068418 | A | 5/2016 | |
| JP | 2016182799 | A | 10/2016 | |
| JP | 2018065338 | A | 4/2018 | |
| JP | 2019077101 | A | 5/2019 | |
| JP | 2019084758 | A | 6/2019 | |
| JP | 2019130879 | A | 8/2019 | |
| JP | 6586915 | B2 | 10/2019 | |
| KR | 20170073100 | A | 6/2019 | |
| WO | WO 2018/139183 | | 8/2018 | |
| WO | WO-2018225663 | A1 * | 12/2018 | ............ B41M 5/155 |
| WO | WO 2019/049619 | | 3/2019 | |
| WO | WO-2019044462 | A1 * | 3/2019 | ............ B41M 5/323 |
| WO | WO 2019/130968 | | 7/2019 | |
| WO | 2023100900 | A1 | 6/2023 | |
| WO | 2023100902 | A1 | 6/2023 | |

OTHER PUBLICATIONS

Avery Dennison™ FreshMarx™ flyer, 2018, 1 page.
FreshMarx™ flyer, "Trust Your Food Safety", 2010, 1 page.
Neenah™ Dispersa™ for Tag and Boardstock brochure, Jul. 2020, 1 page.
Neenah™ Dispersa™ for Labels 7630P0 brochure, Oct. 2020, 1 page.
Smartsolve™ Product Data Sheet, Jul. 21, 2015, 2 pages.
PCT Written Opinion for PCT/US2020/064342, dated Aug. 12, 2021, 6 pages.
PCT Written Opinion for PCT/US2021/062598, dated Apr. 7, 2022, 8 pages.
PCT "International Search Report" and "Written Opinion" for PCT/US2023/029518 of Nov. 23, 2023, 12 pages.
Office Action for Japanese Patent Application No. 2023-534746 issued on May 24, 2024, 5 pages filed herewith.
Written Opinion of the IPEA for PCT/US2023/029518 dated Jun. 27, 2024, 6 pages filed herewith.

* cited by examiner

FADE-RESISTANT WATER-DISPERSIBLE PHENOL-FREE DIRECT THERMAL MEDIA

CROSS-REFERENCE TO RELATED APPLICATIONS

This application claims priority under 35 U.S.C. § 120 as a continuation-in-part of pending patent application U.S. Ser. No. 17/118,217, "Multi-Purpose Phenol-Free Direct Thermal Recording Media", filed Dec. 10, 2020, the contents of which are incorporated herein by reference.

FIELD OF THE INVENTION

The present invention relates to direct thermal record media, with particular application to such media that are water dispersible, and to such media that are substantially phenol-free while incorporating a leuco dye and an acidic developer to provide a heat-activated printing mechanism. The invention also pertains to related methods, systems, and articles.

BACKGROUND

In direct thermal recording, an image is produced by selectively heating the recording material (sometimes called coated thermochromic paper, thermal paper, thermal recording material or media, or thermally-responsive record material) at selected locations by passing the material under, or otherwise across, a thermal print head. The recording material includes a coating of a thermally responsive layer, and the image is provided by a heat-induced change in color of the thermally responsive layer. Some common uses of direct thermal recording may include, without limitation, cash register receipts, labels for food or other goods, or event tickets.

Numerous types of direct thermal record media are known. See, for example, U.S. Pat. No. 3,539,375 (Baum), U.S. Pat. No. 3,674,535 (Blose et al.), U.S. Pat. No. 3,746,675 (Blose et al.), U.S. Pat. No. 4,151,748 (Baum), U.S. Pat. No. 4,181,771 (Hanson et al), U.S. Pat. No. 4,246,318 (Baum), and U.S. Pat. No. 4,470,057 (Glanz). In these cases, basic colorless or lightly colored chromogenic material, such as a leuco dye, and an acidic color developer material are contained in a coating on a substrate which, when heated to a suitable temperature, melts or softens to permit the materials to react, thereby producing a colored mark or image at the place where the heat was applied. Thermally-responsive record materials have characteristic thermal responses, producing a colored image of sufficient intensity upon selective thermal exposure.

Some direct thermal record media have been described or proposed for specialized applications in which the substrate or base material of the product is a water-dissolvable or water-dispersible paper material (in contrast with conventional paper substrates, which are neither water-dissolvable nor water-dispersible), such that the resulting direct thermal record media as a whole can be easily dissolved or dispersed by the end user. See e.g. U.S. Pat. No. 7,476,448 (Natsui et al.). Some such products have been sold, but have suffered from poor quality image formation. That is, when such products are fed through a conventional direct thermal printer to print an image at a normal print speed, such as 6 inches per second (ips), the resulting image quality is typically so poor that a bar code image cannot be reliably scanned and read by standard bar code readers. The poor image quality is believed to be due to the outer surface of the product being too rough or non-smooth, which may result from puckering or swelling of the water-dispersible base stock during manufacturing when a first layer is coated in an aqueous solution onto the surface of the base stock.

Furthermore, concerns were raised many years ago about the presence of phenol-based chemicals in conventional direct thermal recording materials. Originally, phenol material was present in the thermally responsive layer of the thermal recording material, and more specifically, in the developer chemical that reacts with the leuco dye in that layer to produce a thermally-induced color change. Alternative, phenol-free developer chemicals were developed to address these concerns. One group of such chemicals was introduced by Ciba Specialty Chemical Corp. about 20 years ago under the brand Pergafast™, including Pergafast 201 (3-(3-Tosylureido)phenyl p-toluenesulfonate). This is believed to be the most widely used phenol-free developer in the manufacture of phenol-free direct thermal recording materials.

SUMMARY OF THE INVENTION

In connection with our investigation of direct thermal recording media that combine the features of being phenol-free and water-dispersible, we discovered unexpected image fade and image formation problems associated with certain demanding environmental storage conditions, such problems being specific to the phenol-free/water-dispersible combination. We then determined that these problems can be overcome by careful selection and use of certain lesser-known phenol-free acidic developers in the thermally responsive layer of the recording medium, namely, developers that are derivatives of N,N'-diphenylurea.

We have thus developed a new family of direct thermal record materials or media that are both water-dispersible and phenol-free, and that can provide good thermal image quality using conventional direct thermal printers even when such media is subjected to the above-mentioned demanding environmental storage conditions.

We therefore disclose herein, among other things, record materials or media that include a substrate, a thermally responsive layer carried by the substrate, and a base coat between the substrate and the thermally responsive layer. The substrate preferably is or includes a water-soluble or water-dispersible paper. The thermally responsive layer includes a leuco dye and a developer. The record materials may also include a top coat carried by the substrate such that the thermally responsive layer is between the top coat and the substrate.

In order to ensure good thermal image quality even under the demanding storage conditions, the developer is preferably a derivative of N,N'-diphenylurea, and in some cases may be or include at least one of:

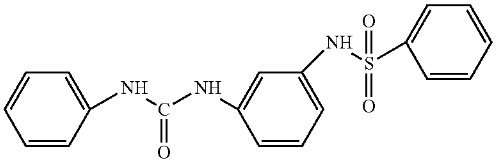
,
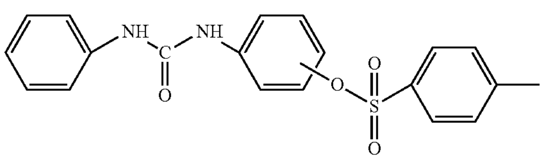
,
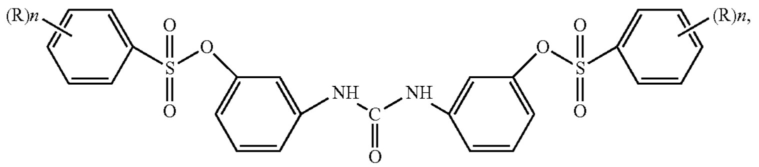
and
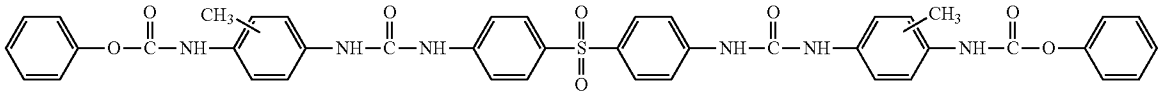
, which we may refer to for convenience by their respective trade names or chemical names NKK-1304 (Nippon Soda Ct., Ltd.), TGMD (Nippon Kayaku Co. Ltd.), S-176 (Sanko Co. Ltd.), and urea urethane ("UU").

At least in cases where the developer is UU, the thermally responsive layer preferably then also includes a second developer—1,3 diphenyl urea ("DPU")—which for purposes of this document is not itself considered to be a derivative of N,N'-diphenylurea.

In some cases, the thermally responsive layer may be substantially devoid of any developers that are not derivatives of N,N'-diphenylurea. In some cases, the developer may be a derivative of N,N'-diphenylurea, and the thermally responsive layer may be substantially devoid of any other developer. In some cases, the thermally responsive layer, and the record material as a whole, may be substantially phenol-free.

Other product features that can be important to the quality of the thermal image, and thus synergistic with the appropriate selection of the developer, are the design details of the base coat. If care is not taken in the base coat design, the quality of the thermal image formed on the record material by a conventional direct thermal printer—irrespective of any exposure to harsh storage environments—may be substandard and unreadable, or the product may fail to achieve the desired water-dispersibility, or both. For this reason, the base coat preferably includes a binder that is non-water-soluble, non-resinous, particulate, derived from a dispersion, and/or latex. Use of such a binder material in a carefully selected concentration, with other elements, provides a base coat that allows for high quality images to be thermally printed at normal print speeds and even high print speeds in the thermally responsive layer. Characteristics of the base coat that help promote such performance are its bulk or thickness, its relatively low thermal conductivity, and its relatively weak internal cohesiveness.

The latex may be present in the base coat in a concentration from 10-30 wt %, or from 15-20 wt %. The base coat may also include a hollow sphere pigment (HSP), which may be present in the base coat in a concentration from 20-50 wt %, or from 30-50 wt %. The base coat may further include a second pigment selected from the group of clay particles, precipitated calcium carbonate, and fumed silica, and the second pigment may be present in the base coat in a concentration less than 80 wt %, or in a range from 10-50 wt %.

The binder material of the base coat, and the base coat itself, are thus non-water-soluble, but nevertheless tailored such that the record material as a whole is not only phenol-free but also water-dispersible—i.e., it breaks apart under the influence of water with minimal agitation.

The record material preferably provides a print quality, when printed with a thermal printer energy setting of 11.7 $mJ/mm^2$ at a print speed of 6 inches per second (ips), characterized by an ANSI value of at least 1.5. Such print quality is also achieved if, before or after the process of thermal printing, the record material is exposed to high heat and high humidity for a prolonged period, representative of demanding but realistic storage or transport conditions. Thus, the print quality of the printed record material may be characterized by an ANSI value of at least 1.5 even where, before the thermal printing is performed, the record material is exposed to air at 40° C. and 90% relative humidity for 24 hours, then removed and cooled. Alternatively or additionally, the print quality of the printed record material may still be characterized by an ANSI value of at least 1.5 after the printed record material is exposed to air at 40° C. and 90% relative humidity for 24 hours, then removed and cooled.

The record material may also include a top coat carried by the substrate such that the thermally responsive layer is disposed between the top coat and the substrate. The record material may also include an adhesive layer disposed on a side of the substrate opposite the thermally responsive layer.

We also disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION

Aspects of the invention include new types of direct thermal record materials/media with new combinations of features and capabilities, and methods of making the same. As a direct thermal record medium, the product is adapted to change color in response to locally applied heat, such as when feeding the product through a direct thermal printer, so as to produce images of bar codes, alphanumeric characters, graphics, or combinations thereof.

The inventive products are preferably characterized by a unique combination of features—phenol-free chemistry and a water-dispersible construction—which we found to present multiple challenges with regard to thermal images: a first challenge of achieving an acceptable initial print quality under standard direct thermal printer settings, given that the substrate is or comprises a delicate water-soluble or water-dispersible paper; and a second challenge of maintaining an acceptable image quality after such a printed direct thermal medium has been exposed to certain demanding hot, humid storage conditions (and/or where the direct thermal medium, before receiving the direct thermal image, was exposed to such conditions).

The first challenge can be addressed by appropriate tailoring of the base coat, substantially as discussed in commonly assigned application U.S. Ser. No. 17/100,349, published as US 2021/0155027 (Fisher), "Water-Dispersible Direct Thermal or Inkjet Printable Media". In brief, the base coat comprises a number of components including a carefully tailored concentration of binder material that is non-water-soluble and non-resinous, particulate, and/or derived from a dispersion, such as latex. Use of such a binder material is counterintuitive insofar as the product of which it is a part is meant to be water-dispersible.

We discovered the second challenge in connection with our further investigation of these types of products, when imposing the additional requirement of being phenol-free. We noticed unexpected and serious image fade and image formation problems associated with exposure to hot, humid storage conditions, such as exposure to air at 40° C. and 90% relative humidity for 24 hours, or even air at 60° C. and 90% relative humidity for the same length of time. Without wishing to be bound by theory, we believe these image fade/formation problems may be due to the close proximity, and interaction, of the chemical materials in the thermally responsive layer to/with the water-soluble or water-dispersible paper substrate, which typically contains a high amount of basic (as opposed to acidic) material.

Figure 1A:
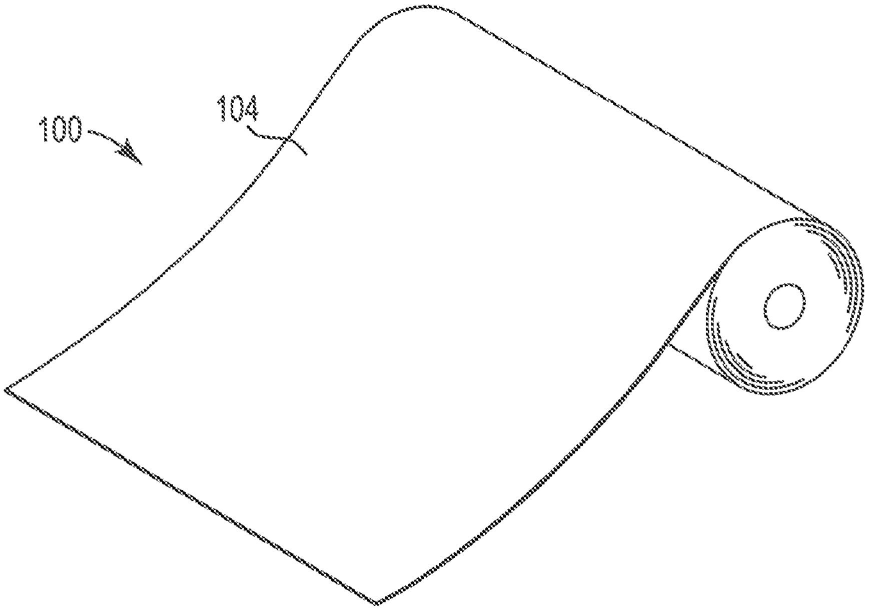
FIG. 1A is a schematic perspective view of a roll of direct thermal recording material or medium.

Direct thermal recording materials, including those disclosed herein, are often manufactured in large roll form, including jumbo rolls, on industrial-sized coating machines using a continuous web of paper material or the like. Such a roll 100 of direct thermal recording material 104 is shown schematically in FIG. 1A. After manufacture, the roll 100 may be shipped to another facility or customer where the material 104 may be converted by slitting, cutting, or other standard operations into individual sheets, labels, or smaller rolls. During transit to such a facility, while in storage before such converting operations, or at some point later in the life cycle of the product, the roll 100 or a piece thereof may be exposed for long periods of time to hot, humid storage conditions such as may be found in trucks, shipping containers, or warehouses.

Figure 1B:
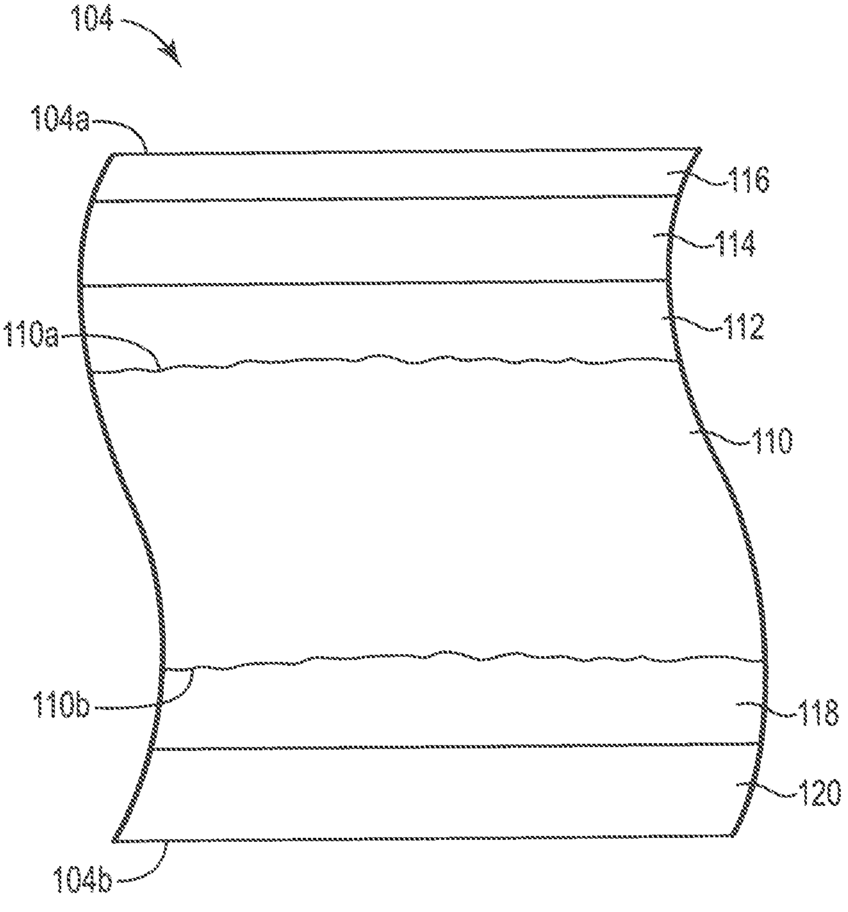
FIG. 1B is a magnified schematic front elevation view, which also serves as a schematic cross-sectional view, of such recording material.

A magnified side or cross-sectional view of an exemplary embodiment of the recording material 104 is shown schematically in FIG. 1B to illustrate typical sub-structure made up of component layers or coatings.

The recording material 104 may be made by applying several different coatings to at least one side or major surface 110*a* of a substrate 110. We may refer to the major surface 110*a* as the front surface of the substrate, and the exposed major surface 104*a* may be the front surface of the recording material 104. The opposite major surface 104*b* may be the back surface of the recording material. Briefly, the substrate 110 is coated to carry a base coat layer 112, a thermally responsive layer 114, and a top coat layer 116. The coatings are preferably applied in the order shown, with the layer 114 located between the layers 112, 116, and with the layer 112 located between the layer 114 and the substrate 110. In some cases, the top coat 116 may be omitted. The coatings can be formed by any suitable coating technique, including roll coating, knife coating, rod coating, gravure coating, curtain coating, spot coating, and so forth. Furthermore, additional layers and coatings can be added to or included with the recording material on its front and/or back side. For example, one or more coatings can be applied to the opposite side of the substrate, i.e., to the major surface 110*b*, as discussed further below. But first, the other elements of the direct thermal recording material 104 will now be described in more detail.

Keep in mind that the recording material 104 is both phenol-free and water-dispersible. In order to be water-dispersible (adapted to disintegrate or break apart/disperse when exposed to water, with minimal agitation), the most massive single component of the material 104—the base stock or substrate 110—should be or include a water-soluble paper or water-dispersible paper. This is in contrast to ordinary paper substrates, which are neither water-soluble nor water-dispersible. Depending on its thickness and composition, the paper of the substrate 110 may be thin and flexible similar to ordinary office paper, or it may be somewhat thicker and stiffer. We use the term "paper" to encompass all such possibilities. The substrate 110 may for example have a thickness in a range from 2.5 mils to 20 mils. The substrate 110 has a physical strength and thickness sufficient to allow it to be manipulated and handled in a coating machine without excessive tearing or breaking. The substrate 110 may thus be in the form of a web with two opposed major surfaces 110*a*, 110*b*. These surfaces are shown as being uneven or rough, which is exacerbated when the surfaces are wetted.

A suitable paper for use as the substrate 110 is Neenah Dispersa™ dispersible paper available from Neenah, Inc., Alpharetta, Georgia Pulp of which the water-dispersible paper is made need not contain large amounts of so-called purified pulp, which contains at least 88 wt % of α-cellulose, or which contains less than 12 wt % of hemi-cellulose. Such purified pulp may for example account for less than 15 wt % of all the pulp in the substrate. There are several product offerings under the Neenah™ Dispersa™ brand, including product code 7630P0 (3.0-3.4 mil thickness, said to be for labels), product code 7741P0 (14 mil thickness, said to be for tag and boardstock), and product code 7742P0 (17 mil thickness, said to be for tag and boardstock).

Other water-dispersible papers suitable for use as the substrate 110 are also available. Aquasol Corporation of North Tonawanda, NY sells a 3 mil thick water-dispersible flexible paper under product code ASW-35/S. SmartSolve Industries (part of CMC Group, Bowling Green, OH) sells a number of water-dispersible paper products, such as a 3 mil thick water-dispersible flexible paper under product code IT117970.

Some of the commercially available water-dispersible papers mentioned above are described in their respective manufacturers' marketing literature as "water-soluble".

In some embodiments, the water-dispersible paper of the substrate 110 may contain increased amounts of the purified pulp as disclosed in U.S. Pat. No. 8,877,678 (Koyama et al.). The purified pulp may for example account for 15-95 wt % of all the pulp in the substrate.

When one is concerned with producing a recording material that will yield direct thermal images of high enough quality to be reliably machine readable (not all manufacturers have such concerns), the water soluble/dispersible nature of the substrate 110 poses a challenge to that objective. Applying an ordinary aqueous coating to the surface of the substrate 110 can cause it to pucker or swell, which may produce a surface that is excessively rough or non-smooth such that the finished product is not capable of reliably forming a high quality direct thermal image under ordinary print conditions and print speeds. Consequently, the base coat 112, which may be applied directly to the major surface 110*a*, is carefully designed to avoid such problems while also allowing the overall product to be water-dispersible.

The base coat 112 is specially tailored to provide a balanced combination of features. These include: having a sufficient bulk or thickness to be able to smooth over undulations or roughness of the major surface 110*a* of the substrate; having a sufficient air content to provide good thermal isolation (low thermal conductivity); and having an internal cohesiveness that is strong enough to remain intact during normal handling of the product but weak enough to break apart (disperse) when exposed to water after the underlying substrate 110 has dissolved, or begun to dissolve, or has dispersed, or begun to disperse.

To help achieve this combination of properties, the base coat 112 preferably uses a non-water-soluble binder material. Such a binder material, when used in a judicious amount and in combination with other components of the base coat, allows the resulting record medium to be water-dispersible, i.e., it breaks apart under the influence of water with minimal agitation. The binder material of the base coat, and the base coat itself, are thus non-water-soluble, but nevertheless tailored such that the record material as a whole is water-dispersible. The binder material of the base coat is preferably a non-resinous binder, a particulate binder, and/or a binder derived from a dispersion, such as latex. Use of such a binder material in a carefully selected concentration, with other elements, provides a base coat that allows for high quality images to be thermally printed on the thermally responsive layer at normal print speeds such as 6 inches per second (ips), as well as higher print speeds.

A suitably tailored base coat 112, applied (directly) to an outer surface of the substrate 110, can substantially improve the imaging characteristics of the product, even though applying a water-based coating to the base stock increases the surface roughness. The base coat 112 is preferably neither too thin nor too thick. An insufficient coat weight produces a base coat that does not adequately insulate the thermally responsive layer 114 from the substrate, and that simply conforms to the undulating profile of the substrate. Increasing the coat weight of the base coat 112 has practical limitations because more water can cause more instability and roughening of the sheet during the coating procedure. Also, a base coat 112 that is too thick can make the internal cohesiveness of the layer too strong, thwarting the ability of the layer 112 (and the overall product 104) to break apart and disperse quickly when exposed to water. Preferably, the base coat 112 may have a thickness of at least 2 micrometers, and a coat weight in a range from 1 to 5 lbs/3300 $ft^2$ (1.5 to 7.5 $g/m^2$), but other coat weights and thicknesses may also be used if desired.

In order to increase the bulk as well as the air content of the base coat 112, we have found it useful to incorporate a hollow sphere pigment (HSP), such as Ropaque™ pigment from Dow Chemical, into the base coat. The hollow polymeric particles of the HSP can improve the bulk (thickness) of the base coat to smooth over effects of the roughening of the surface of the substrate 110. A benefit of HSP is that, if the product is calendared during the manufacturing process (after the base coat has been applied to the base stock, and dried), the HSP particles can deform on the surface in contact with the calendar surface, under the pressure of the nip, to provide a smoother surface than can be made using conventional pigments. HSP particles typically have an average diameter of a few micrometers or less, e.g. in a range from 0.4 to 2 micrometers. HSP particles are not soluble in water.

Other pigments besides HSP, such as calcine clay or other clay particles, and/or other particles that have good bulk and water absorbing properties, such as precipitated calcium carbonate (PCC) or fumed silica, can also be used—and preferably are used—in the base coat 112, but do not typically by themselves provide the bulk needed to overcome the roughening of the base stock. Such other pigments are not, or may not be, soluble in water. A mixture of HSP and one or more other pigments in the base coat 112 can provide a good balance of improved coverage, smoothness, and sheet integrity, allowing for high-speed (and normal speed) direct thermal printing of machine readable bar codes.

Another significant design consideration, and aspect of the invention, is the binder material to be used in the base coat 112. Conventional wisdom would suggest that the binder material used in the base coat 112 of a water-dispersible record material 104 should be water-soluble. But we have found that water-soluble binder materials tend to increase the thermal conductivity, and reduce the thermal insulation characteristic, of the base coat. Reduced thermal insulation degrades image quality, since the print quality of a direct thermal image is enhanced by thermally isolating the direct thermal layer from the base stock as much as possible. In contrast, our preferred binder materials—which are not water soluble—provide a quick-drying solution, and if used at a carefully tuned concentration, provide improved thermal insulation properties over the water-soluble binders while not impeding the water-dispersible nature of the substrate. Preferred binder materials for the base coat 112 include those that are non-water-soluble, those that are non-resinous, those that are a particulate binder, and/or those that are derived from a dispersion. An exemplary such binder material is latex. Alternative or additional binder materials may include cooked starch, polyvinyl alcohol (PVA), and AQ™ polymers available from the Eastman Chemical Company.

Figure 2:
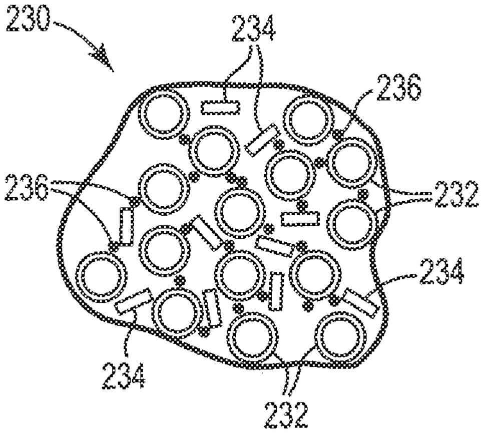
FIG. 2 is a schematic magnified view of a portion of a base coat used in the recording material of FIG. 1B.

Carefully tuning this binder concentration balances the need to hold the pigment particles together in order to withstand normal handling of the material 104, with the need to provide an abundant number of air pockets and air gaps throughout the base coat 112 in order to increase thermal insulation, as well as with the need to provide a relatively weak internal cohesiveness of the base coat so that it readily breaks apart when the underlying substrate 110 begins to disintegrate or dissolve under the action of water. A schematic depiction of such a balanced or tuned state of affairs is shown in the magnified view of FIG. 2. There, a representative but small portion 230 of a base coat 112 is made up of HSP particles 232, particles 234 of a second pigment such as calcine clay, and binder particles 236 such as latex. The binder particles 236 are numerous enough to adequately hold the pigment particles together, but sparse enough to maintain an abundant number of air pockets and air gaps between the particles for adequate thermal insulation.

To provide the desired balance of characteristics, the latex or other suitable non-water-soluble binder is preferably present in the base coat 112 in a concentration from 10-30 wt %, or from 15-20 wt %. The HSP is preferably present in the base coat 112 in a concentration from 20-50 wt %, or from 30-50 wt %. The calcine clay or other suitable second pigment is preferably present in the base coat in a concentration less than 80 wt %, or in a range from 10-50 wt %.

Turning back to FIG. 1B, the thermally responsive layer 114 is then coated atop the base coat 112. To provide the thermal print functionality, this layer 114 includes the combination of a leuco dye or other basic chromogenic material, and an acidic color developer material, dispersed substantially uniformly throughout the layer in a solid matrix or binder.

Leuco dyes are generally not phenol-based, and we have found that the types of problems discussed herein are not substantially affected by the selection of leuco dye used in the layer 114. Thus, substantially any suitable leuco dye may be used.

The same cannot be said for the developer. To avoid the use of any significant amount of phenol-based chemicals in the recording material 104, the developer used in the layer 114 should be substantially phenol-free, and if multiple developers are used rather than just one, they should preferably all be substantially phenol-free. But as noted above, we discovered that some phenol-free developer materials, including the most widely used phenol-free developer, can give rise to long-term image fade or image formation problems. These problems may be easily overlooked by the product designer, since direct thermal recording products incorporating those chemicals can provide fully acceptable direct thermal images as long as the product is not subjected to the types of hot, humid storage conditions we describe.

The image fade and image formation problems associated with hot, humid storage conditions, and developers that can be used to avoid such problems, are demonstrated in the testing results we describe below. Briefly summarized, the developer used in the thermally responsive layer 114 of the recording material 104 is preferably a derivative of N,N'-diphenylurea. Exemplary such materials include:

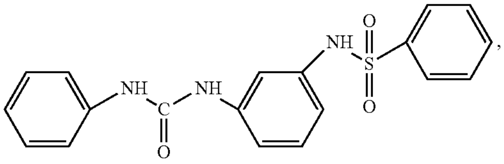
,
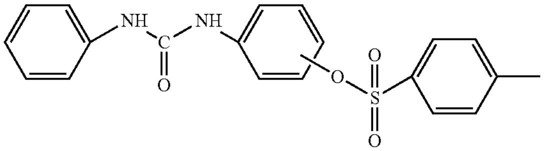
,

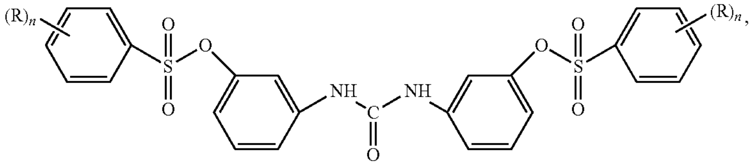
, and

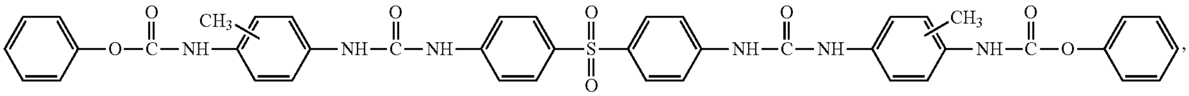
, which we may refer to for convenience by their respective trade names or chemical names NKK-1304 (Nippon Soda Ct., Ltd.), TGMD (Nippon Kayaku Co. Ltd.), S-176 (Sanko Co. Ltd.), and urea urethane ("UU").

Among this list of exemplary chemicals, urea urethane ("UU") is a special case, because if it is used by itself as the only developer in the layer 114, the image produced by the direct thermal recording material 104 (if printed under standard conditions, with a thermal printer energy setting of 11.7 mJ/mm$^2$ at a print speed of 6 inches per second) is substandard and unacceptable, characterized by a very faint image having an ANSI value of well under 1.5. On the other hand, the use of 1,3 diphenyl urea ("DPU", which is phenol-free but for purposes of this document is not itself considered to be a derivative of N,N'-diphenylurea) by itself as the only developer in the layer 114 is also unacceptable, but for a different reason: although the thermal image printed under standard conditions typically has fully adequate darkness/contrast/visibility, and an ANSI value above 1.5, it exhibits substantial image fade whereby the ANSI value drops below 1.5. If some of the DPU is replaced with UU, such that the UU and DPU are used in combination, dispersed together throughout the layer 114 along with a suitable leuco dye, the resulting product provides a thermal image that is, predictably, somewhat fainter and not as dark as a "DPU only" counterpart (but whose ANSI value is still an acceptable 1.5 or greater), but unpredictably and unexpectedly, the visibility of the image has good persistence, and does not suffer from the image fade problems of the "DPU only" counterpart. Substantially no developers other than DPU and UU may be present in the thermally responsive layer, and the DPU and UU may be present in the thermally responsive layer in a relative weight ratio that falls within a range from ⅓ to 3, or from ½ to 2, or which may be substantially 1. The layer 114 may have a coat weight of less than 1.48 g/m$^2$ (1 lb/3300 ft$^2$), or in a range from 0.9 to less than 1.48 g/m$^2$.

For purposes of this document, "DPU" may alternatively be referred to by names such as: 1-3-Diphenylurea or 1-3-diphenylurea; N,N'-Diphenylurea; Diphenylurea; Urea, N,N'-diphenyl-; CARBANILIDE; or Diphenylcarbamide. "UU" may alternatively be referred to by names such as: urethane urea; urethane-urea copolymer; polyurethane urea, or poly(urethane urea); polyurethane urea elastomer, or poly(urethane urea) elastomer; polyurea-urethane; poly (urea) urethane; poly(urea-urethane) polymer; poly(urea-urethane) thermoset; poly(ether urethane urea); poly(ester urethane urea); or poly(ester urethane) urea elastomer.

Further details of the DPU/UU combination can be found in the above-cited US patent application, U.S. Ser. No. 17/118,217, "Multi-Purpose Phenol-Free Direct Thermal Recording Media", filed Dec. 10, 2020. Examples are provided there of direct thermal recording media that use a standard paper substrate (not water-dispersible or water-dissolvable) and DPU and UU in combination in the thermally responsive layer, in weight ratios that range from 1:3 to 1:1 to 3:1. The examples exhibit an acceptable image quality (ANSI of at least 1.5) when initially printed under standard direct thermal print conditions, and most also exhibit an acceptable image quality (ANSI of at least 1.5) when subjected to various environmental tests including dry heat, contact with plasticizer film, room temperature water soak, boiling water, 40° C./90% RH, sunlight, and contact with liquid hand sanitizer.

In contrast to the DPU/UU combination, the examples below demonstrate that other non-phenolic developers that are derivatives of N,N'-diphenylurea, including NKK-1304, TGMD, and S-176, can be used with success as the only developer in the layer 114, producing clear thermal images when printed under standard direct thermal printing conditions. Alternatively, if desired, these developers can be used in combination with each other, or with other non-phenolic developers, in the layer 114. Other than cases involving the combination of DPU and UU, the layer 114 is preferably substantially devoid of any developers that are not derivatives of N,N'-diphenylurea.

Turning again to FIG. 1B, an optional protective top coat 116 can be applied to the thermally responsive layer 114 to improve durability to handling such as scuff, and can be added to the product while retaining the product features of water dispersibility and high quality thermal printing. The top coat 116 may be of conventional design, e.g., comprising binders such as modified or unmodified polyvinyl alcohols, acrylic binders, crosslinkers, lubricants, and fillers such as aluminum trihydrate and/or silicas.

On the other side of the substrate 110, an optional adhesive layer 118 such as a pressure-sensitive adhesive (PSA) or other adhesive material may be applied to the major surface 110*b* to allow the recording material 104 to be used as a self-adhesive label. Such an adhesive is preferably itself water-dispersible or water-dissolvable so that after use, the entire label can be easily washed away and completely removed from the workpiece to which it was attached by the user, e.g. after direct thermal printing. The adhesive may be releasably supported or carried by an optional release liner 120. In the case of a label product, a user may remove the release liner 120 after forming a thermal image in the direct thermal layer 114, and affix the label so printed to a container or other suitable workpiece with the adhesive layer 118. After use, the label may be completely removed from the container by applying water with minimal or gentle agitation, causing the label to break apart to restore the container surface to its original state.

EXAMPLES

Example 1: A record material as shown generally in FIG. 1B, but without layers 118 and 120, was made and tested. The substrate 110 used was the Neenah Dispersa™ dispersible paper, product code 7630P0, referenced above. A base coat 112 was then applied to the major surface 110*a* at a coat weight of 6 grams per square meter (gsm). The formulation of the base coat was as follows (all parts are by weight unless otherwise noted):

Water: 40.5 parts
Mineral Pigment 1A: 21.5 parts
HSP @19.5% solids in water: 26.3 parts
Latex @50% solids in water: 11.5 parts The Mineral Pigment 1A was Calcine Clay (Kaocal by Thiele Kaolin Company). The HSP used was Ropaque TH-2000AF by Dow Chemical, having an average diameter of nominally 1.6 micrometers. The Latex used was SBR latex (LIGOS KX4505 by Trinseo LLC.).

After drying, a thermally responsive layer 114 was applied to the exposed surface of the base coat. The layer was made using a coating formulation as follows:

Dispersion A (leuco dye): 22.0 parts
Dispersion B (developer): 38.0 parts
Binder, 10% solution of polyvinylalcohol in water: 25.0 parts
Filler slurry, 30% in water: 15.0 parts, where Dispersion A (comprising the leuco dye or chromogenic material) was:

ODB-2 (2-anilino-3-methyl-6-dibutylaminofluoran): 30.0 parts

Binder, 20% solution of polyvinylalcohol in water): 25.0 parts

Defoaming and dispersing agents: 0.4 parts

Water: 44.6 parts, and Dispersion B (comprising the developer) was:

NKK-1304 (from Nippon Soda Ct., Ltd.): 38.0 parts

Binder, 20% solution of polyvinylalcohol in water: 18.0 parts

Defoaming and dispersing agents: 0.4 parts

Water: 43.6 parts.

The chemical formula for NKK-1304 is given above. This formulation was applied to the base coat at a coat weight of 2.0 gsm to form the thermally responsive layer 114.

After drying, a top coat 116 was applied to the exposed surface of the thermally responsive layer. This layer was made using a coating formulation as follows:

Filler slurry, 30% aluminum hydroxide in water: 23.0 parts

Aqueous solution of polyvinyl alcohol in an amount of 10%: 63.0 parts

Zinc state in an amount of 44% in water: 1.0 parts

Crosslinker, 12.5% in water: 13.0 parts

This formulation was applied to the thermally responsive layer at a coat weight of 1.5 gsm to form the top coat 116.

Example 1-SS: A record material was made in the same manner as Example 1, except that a SmartSolve™ 3 point ("3 pt") water-dispersible ("water-soluble") paper from SmartSolve Industries was used as the substrate instead of the Neenah Dispersa™ dispersible paper.

Example 2: A record material was made in the same manner as Example 1, except that in the Dispersion B, the developer TGMD (from Nippon Kayaku Co. Ltd.) was used instead of NKK-1304. The chemical formula for TGMD is given above.

Example 2-SS: A record material was made in the same manner as Example 2, except that the 3 pt. SmartSolve™ dispersible paper referenced above was used as the substrate instead of the Neenah Dispersa™ dispersible paper.

Example 3: A record material was made in the same manner as Example 1, except that in the Dispersion B, the developer S-176 (from Sanko Co. Ltd.) was used instead of NKK-1304. The chemical formula for S-176 is given above.

Example 3-SS: A record material was made in the same manner as Example 3, except that the 3 pt. SmartSolve™ dispersible paper referenced above was used as the substrate instead of the Neenah Dispersa™ dispersible paper.

Example 4: A record material was made in the same manner as Example 1, except that in the Dispersion B, the NKK-1304 was replaced by a 50/50 solution of UU (from Chemipro Kasei Kaisha Ltd.) and DPU. The chemical formulae for UU and DPU are given above.

Comparative Example 5: A record material was made in the same manner as Example 1, except that in the Dispersion B, the developer NKK-1304 was replaced by 4-Hydroxyphenyl-4-isopropoxyphenylsulfone (trade name "D-8"), which is represented by the formula:

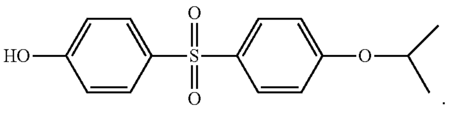 [SMILES: CC(C)Oc1ccc(S(=O)(=O)c2ccc(O)cc2)cc1]

Comparative Example 5-SS: A record material was made in the same manner as Comparative Example 5, except that the 3 pt. SmartSolve™ dispersible paper referenced above was used as the substrate instead of the Neenah Dispersa™ dispersible paper.

Comparative Example 6: A record material was made in the same manner as Example 1, except that in the Dispersion B, the developer NKK-1304 was replaced by 4-Hydroxyphenyl sulfone (trade name "BPS"), which is represented by the formula:

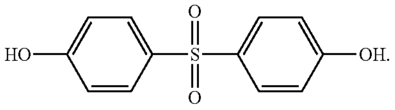 [SMILES: O=S(=O)(c1ccc(O)cc1)c1ccc(O)cc1]

Comparative Example 7: A record material was made in the same manner as Example 1, except that in the Dispersion B, the developer NKK-1304 was replaced by 4-Benzyloxyphenyl-4'-hydroxyphenyl sulfone (trade name "BPS-MBE"), which is represented by the formula:

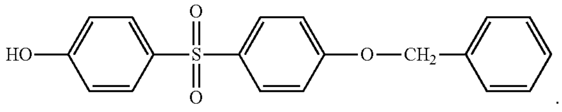 [SMILES: O=S(=O)(c1ccc(O)cc1)c1ccc(OCc2ccccc2)cc1]

Comparative Example 8: A record material was made in the same manner as Example 1, except that in the Dispersion B, the developer NKK-1304 was replaced by 2,2'-Diallyl-4,4'Sulfonyldiphenol (trade name "TGSH"), which is represented by the formula:

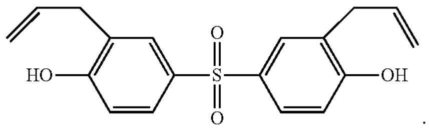 [SMILES: C=CCc1cc(S(=O)(=O)c2ccc(O)c(CC=C)c2)ccc1O]

Comparative Example 8-SS: A record material was made in the same manner as Comparative Example 8, except that the 3 pt. SmartSolve™ dispersible paper referenced above was used as the substrate instead of the Neenah Dispersa™ dispersible paper.

Comparative Example 9: A record material was made in the same manner as Example 1, except that in the Dispersion B, the developer NKK-1304 was replaced by 1-butyl-3-(4-methyl phenyl) sulfonyl urea (trade name "Tolbutamide"), which is represented by the formula:

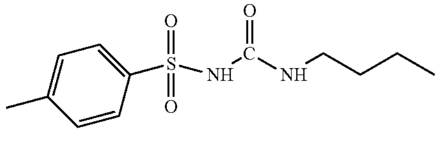 [SMILES: CCCCNC(=O)NS(=O)(=O)c1ccc(C)cc1]

Comparative Example 10: A record material was made in the same manner as Example 1, except that in the Dispersion B, the developer NKK-1304 was replaced by N-(p-Toluenesulfonyl)-N'-(3-p-toluenesulfonyloxyphenyl)urea (trade name "Pergafast 201") from Solenis LLC, which is represented by the formula:

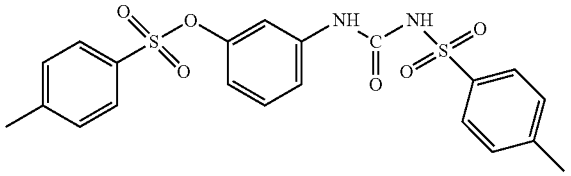

Comparative Example 10-SS: A record material was made in the same manner as Comparative Example 10, except that the 3 pt. SmartSolve™ dispersible paper referenced above was used as the substrate instead of the Neenah Dispersa™ dispersible paper.

Additional comparative examples were also fabricated in which the dispersible paper substrate was replaced with a "standard" (neither water-dispersible nor water-dissolvable) paper substrate. The standard paper substrate that was used was an uncoated free sheet having a basis weight of 62 gsm. For reference purposes, we use the suffix "-Std" to designate these comparative examples. Thus, we made a direct thermal recording material substantially the same as Example 1 except that the Dispersa™ substrate was replaced with the standard paper substrate, and we refer to it as Comparative Example 1-Std, and likewise for Examples 2, 3, and 4, whose counterpart comparative examples (containing the standard paper substrate rather than the Dispersa™ substrate) we refer to as Comparative Examples 2-Std, 3-Std, 4-Std, respectively. Similarly, a direct thermal recording material like that of Comparative Example 5 was made except that the Dispersa™ substrate was replaced with the standard paper substrate, and we refer to it as Comparative Example 5-Std, and likewise for Comparative Examples 6, 7, 8, 9, and 10.

Pertinent characteristics of the above Examples and Comparative Examples are summarized, for convenience, in Table 1:

TABLE 1

Summary Characteristics of Examples, Comparative Examples

| Example/Comp. Ex. | substrate | leuco dye | developer |
|---|---|---|---|
| 1 | Dispersa ™ | ODB-2 | NKK-1304 |
| 1-SS | SmartSolve ™ | ODB-2 | NKK-1304 |
| CE 1-Std | (standard) | ODB-2 | NKK-1304 |
| 2 | Dispersa ™ | ODB-2 | TGMD |
| 2-SS | SmartSolve ™ | ODB-2 | TGMD |
| CE 2-Std | (standard) | ODB-2 | TGMD |
| 3 | Dispersa ™ | ODB-2 | S-176 |
| 3-SS | SmartSolve ™ | ODB-2 | S-176 |
| CE 3-Std | (standard) | ODB-2 | S-176 |
| 4 | Dispersa ™ | ODB-2 | UU & DPU (50:50) |
| CE 4-Std | (standard) | ODB-2 | UU & DPU (50:50) |
| CE 5 | Dispersa ™ | ODB-2 | D-8 |
| CE 5-SS | SmartSolve ™ | ODB-2 | D-8 |
| CE 5-Std | (standard) | ODB-2 | D-8 |
| CE 6 | Dispersa ™ | ODB-2 | BPS |
| CE 6-Std | (standard) | ODB-2 | BPS |
| CE 7 | Dispersa ™ | ODB-2 | BPS-MBE |
| CE 7-Std | (standard) | ODB-2 | BPS-MBE |
| CE 8 | Dispersa ™ | ODB-2 | TGSH |
| CE 8-SS | SmartSolve ™ | ODB-2 | TGSH |
| CE 8-Std | (standard) | ODB-2 | TGSH |
| CE 9 | Dispersa ™ | ODB-2 | Tolbutamide |
| CE 9-Std | (standard) | ODB-2 | Tolbutamide |
| CE 10 | Dispersa ™ | ODB-2 | Pergafast 201 |
| CE 10-SS | SmartSolve ™ | ODB-2 | Pergafast 201 |
| CE 10-Std | (standard) | ODB-2 | Pergafast 201 |

All of the samples in Table 1 were phenol-free or substantially phenol-free. Samples of the above Example and Comparative Example direct thermal recording materials were then subjected to various tests and measurements.

In a first test, samples were given a direct thermal barcode image using a Zebra™ model 140-401 thermal printer, at a standard speed of 6 ips at factory default heat setting (nominally 11.7 mJ/$mm^2$). The quality of the resulting bar code image was then assessed according to the American National Standards Institute (ANSI) barcode methodology, using a calibrated TruCheck™ Barcode Verifier, model TC-843, operating at a wavelength of 650 nm, and also separately measured using a calibrated TruCheck™ Barcode Verifier, model TC-854, operating at a wavelength of 670 nm. We refer to the output of each of these devices as an "Initial" ANSI value for the tested barcode image. An ANSI value of at least 1.5 indicates a passing score, i.e., that the image is reliable for machine barcode reading. An ANSI value less than 1.5 is a failing score, and indicates the image cannot be reliably read using a machine barcode reader. In all relevant tests we performed on the samples, the two separate ANSI values (one measured at 650 nm with the TC-843, the other measured at 670 nm with the TC-854) were in agreement, i.e., they were either both "pass" (at least 1.5) or both "fail" (less than 1.5).

Some of the samples that were thermally printed in the manner described above were then afterwards subjected to a "heat only" test. Here, a given sample that had been imaged with a direct thermal image was placed in a temperature-controlled environment of hot air at 60° C. for 24 hours, and then removed and allowed to cool to ambient room temperature. The humidity in the temperature-controlled environment was low, less than 20% RH. The quality of the image was then re-measured using the TruCheck devices.

Some of the samples were subjected to a "post-40/90" test. Here, a given sample that had already been imaged with a direct thermal image as described above, but that had not been subjected to the "heat only" test, was placed in a chamber whose temperature and humidity was controlled. The temperature was controlled to 40° C. and the relative humidity was controlled to 90%. After 24 hours in the chamber, the sample was removed, allowed to cool to ambient room temperature, and the quality of the image was re-measured using the TruCheck devices.

Some of the samples were subjected to a "post-60/90" test. This was substantially the same as the "post-40/90" test (and was performed on samples that had already been thermally imaged but had not otherwise been subjected to any heated environments), but where the chamber was controlled to a temperature of 60° C. and a relative humidity of 90%. After removal from the hot, humid environment and after being allowed to cool, the quality of the image was re-measured using the TruCheck devices.

Some of the samples were subjected to a "pre-40/90" test. Here, a given sample that had not yet been imaged, and that had not been subjected to the "heat only" test or any other heated environment, was placed in a chamber whose temperature and humidity was controlled. The temperature was controlled to 40° C. and the relative humidity was controlled to 90%. After 24 hours in the chamber, the sample was removed and allowed to cool to ambient room temperature. Then, the sample was given a direct thermal barcode image using the same Zebra™ 140-401 thermal printer mentioned above, and at the same print settings. The quality of the image so made was measured using the TruCheck devices described above.

The results of these tests were as follows:

TABLE 2

| Tests on Samples (Comparative Examples) Having a Standard Paper Substrate | | | | |
|---|---|---|---|---|
| Sample | "Initial" ANSI | "Heat Only" ANSI | "Post-40/90" ANSI | "Pre-40/90" ANSI |
| CE 1-Std | pass | pass | pass | pass |
| CE 2-Std | pass | pass | pass | pass |
| CE 3-Std | pass | pass | pass | pass |
| CE 4-Std | pass | pass | pass | pass |
| CE 5-Std | pass | pass | pass | pass |
| CE 6-Std | pass | pass | pass | pass |
| CE 7-Std | pass | pass | pass | pass |
| CE 8-Std | pass | pass | pass | pass |
| CE 9-Std | pass | pass | pass | pass |
| CE 10-Std | pass | pass | pass | pass |

The results in Table 2 demonstrate that there were no image fade or image formation problems for samples that used a conventional paper substrate.

TABLE 3

| Tests on Samples Having a Dispersa ™ Paper Substrate | | | | |
|---|---|---|---|---|
| Sample | "Initial" ANSI | "Heat Only" ANSI | "Post-40/90" ANSI | "Pre-40/90" ANSI |
| 1 | pass | pass | pass | pass |
| 2 | pass | pass | pass | pass |
| 3 | pass | pass | pass | pass |
| 4 | pass | pass | pass | pass |
| CE 5 | pass | pass | fail | fail |
| CE 6 | pass | pass | fail | fail |
| CE 7 | pass | pass | fail | fail |
| CE 8 | pass | pass | fail | fail |
| CE 9 | pass | pass | fail | fail |
| CE 10 | pass | pass | fail | fail |

The results in Table 3 demonstrate that when the Dispersa-brand water dispersible substrate was used to make phenol-free direct thermal recording materials, all of the samples passed the initial and "heat only" tests, but only the samples that used a developer comprising a derivative of N,N'-diphenylurea avoided an unacceptable image fade problem and an unacceptable image formation problem associated with the extended high heat/high humidity tests.

TABLE 4

| Tests on Samples Having a SmartSolve ™ Paper Substrate | | | | |
|---|---|---|---|---|
| Sample | "Initial" ANSI | "Heat Only" ANSI | "Post-40/90" ANSI | "Pre-40/90" ANSI |
| 1-SS | pass | pass | pass | pass |
| 2-SS | pass | pass | pass | pass |
| 3-SS | pass | pass | pass | pass |
| CE 5-SS | pass | pass | fail | fail |
| CE 8-SS | pass | pass | fail | fail |
| CE 10-SS | pass | pass | fail | fail |

The results in Table 4 are similar to those of Table 3, and demonstrate that when the SmartSolve-brand water dispersible substrate was used to make phenol-free direct thermal recording materials, all of the available samples passed the initial and "heat only" tests, but only the samples that used a developer comprising a derivative of N,N'-diphenylurea avoided an unacceptable image fade problem and an unacceptable image formation problem associated with the extended high heat/high humidity tests.

TABLE 5

| Tests—Including Higher Temperature Tests—on Examples 1 through 4 | | | |
|---|---|---|---|
| Sample | "Initial" ANSI | "Heat Only" ANSI | "Post-60/90" ANSI |
| 1 | pass | pass | fail |
| 2 | pass | pass | fail |
| 3 | pass | pass | pass |
| 4 | pass | pass | fail |

The "Initial" and "Heat Only" results in Table 5 are simply repeated from Table 3, but the results in the final column "Post-60/90" demonstrate that Example 3, which uses S-176 for the developer in the thermally responsive layer, is even more robust in that regard than the other three Examples.

In the foregoing detailed description of the present disclosure, reference is made to the accompanying drawings that form a part hereof, and in which are shown by way of illustration how at least some examples of the disclosure may be practiced. These examples are described in sufficient detail to enable those of ordinary skill in the art to practice the invention.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings herein. Not to limit the application of the doctrine of equivalents to the scope of the claims, each numerical parameter should at least be construed in light of the number of reported significant digits and by applying ordinary rounding techniques.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

I claim:

1. A record material, comprising:

a substrate that includes water-dispersible paper;

a thermally responsive layer carried by the substrate;

a base coat between the substrate and the thermally responsive layer; and an adhesive layer directly disposed on a side of the substrate opposite the thermally responsive layer, wherein the adhesive layer is water-soluble;

wherein the base coat includes a non-water-soluble binder, a hollow sphere pigment (HSP) and a second pigment selected from the group of clay particles, precipitated calcium carbonate and fumed silica;

wherein the thermally responsive layer includes a leuco dye and a developer, and the developer comprises a derivative of N,N'-diphenylurea, wherein the derivative of N,N'-diphenylurea comprises at least one of

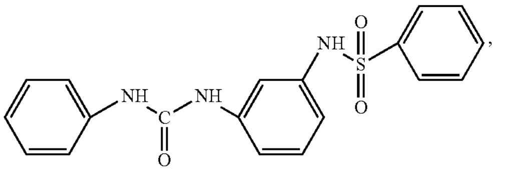

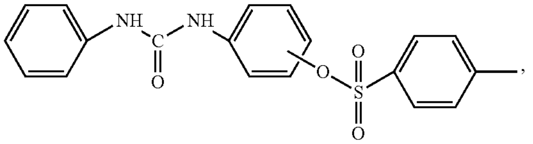

and

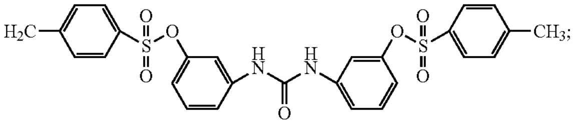

and wherein the record material is substantially phenol-free.

2. The record material of claim 1, wherein the developer comprises:

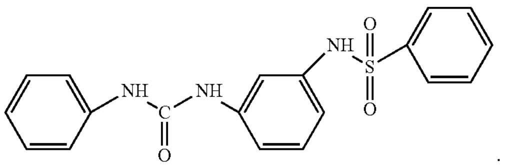 [SMILES: O=C(Nc1ccccc1)Nc1cccc(NS(=O)(=O)c2ccccc2)c1]

3. The record material of claim 1, wherein the developer comprises:

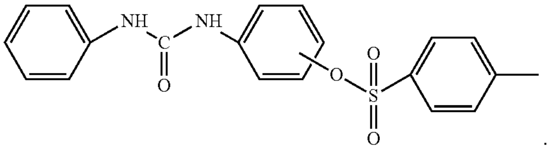

4. The record material of claim 1, wherein the developer comprises:

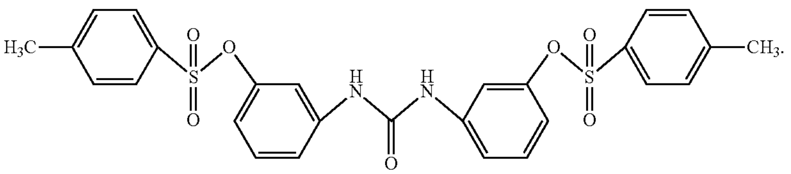

5. The record material of claim 1, wherein the developer consists essentially of the derivative of N,N'-diphenylurea.

6. The record material of claim 1, wherein the developer is a derivative of N,N'-diphenylurea, and wherein the thermally responsive layer consists essentially of the leuco dye and the developer.

7. The record material of claim 1, wherein the record material is water dispersible even though the base coat is non-water-soluble.

8. The record material of claim 1, wherein the non-water-soluble binder includes latex.

9. The record material of claim 1, wherein a print quality of the record material when printed with a thermal printer energy setting of 11.7 $mJ/mm^2$ at a print speed of 6 inches per second (ips) is characterized by an ANSI value of at least 1.5.

10. The record material of claim 9, wherein the print quality of the printed record material is characterized by an ANSI value of at least 1.5 even where, before the thermal printing is performed, the record material is exposed to air at 40° C. and 90% relative humidity for 24 hours, then removed and cooled.

11. The record material of claim 9, wherein the print quality of the printed record material is still characterized by an ANSI value of at least 1.5 after the printed record material is exposed to air at 40° C. and 90% relative humidity for 24 hours, then removed and cooled.

12. The record material of claim 1, further comprising:

a top coat carried by the substrate such that the thermally responsive layer is disposed between the top coat and the substrate.

13. A record material, comprising:

a substrate that includes water-dispersible paper;

a thermally responsive layer carried by the substrate;

a base coat between the substrate and the thermally responsive layer;

a top coat carried by the substrate such that the thermally responsive layer is disposed between the top coat and the substrate; and an adhesive layer directly disposed on a side of the substrate opposite the thermally responsive layer, wherein the adhesive layer is water-soluble, a hollow sphere pigment (HSP) and a second pigment selected from the group of clay particles, precipitated calcium carbonate and fumed silica;

wherein the base coat includes a non-water-soluble binder;

wherein the record material is substantially phenol-free;

wherein a print quality of the record material when printed with a thermal printer energy setting of 11.7 $mJ/mm^2$ at a print speed of 6 inches per second (ips) is characterized by an ANSI value of at least 1.5;

wherein the print quality of the printed record material is characterized by an ANSI value of at least 1.5 (a) after the printed record material is exposed to air at 40° C. and 90% relative humidity for 24 hours, then removed and cooled, or (b) in cases where, before thermal printing is performed, the record material is exposed to air at 40° C. and 90% relative humidity for 24 hours, then removed and cooled; and wherein the thermally responsive layer includes a leuco dye and a developer, and the developer comprises a derivative of N,N'-diphenylurea selected from at least one of:

of:

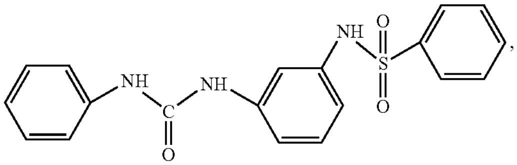

,

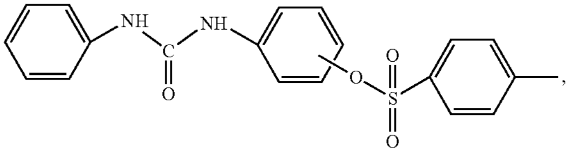

, and

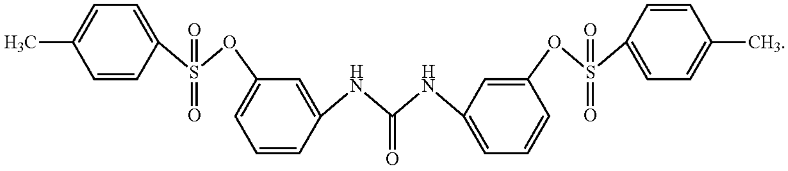 [SMILES: Cc1ccc(S(=O)(=O)Oc2cccc(NC(=O)Nc3cccc(OS(=O)(=O)c4ccc(C)cc4)c3)c2)cc1]

.

14. The record material of claim 13, wherein the developer consists essentially of the derivative of N,N'-diphenylurea.

15. The record material of claim 13, wherein the developer is a derivative of N,N'-diphenylurea, and wherein the thermally responsive layer consists essentially of the leuco dye and the developer.

* * * * *